(12) United States Patent
Nakai et al.

(10) Patent No.: US 9,853,452 B2
(45) Date of Patent: Dec. 26, 2017

(54) POWER CONTROL APPARATUS, POWER CONTROL METHOD, PROGRAM, AND ENERGY MANAGEMENT SYSTEM

(71) Applicant: OMRON Corporation, Kyoto-shi, Kyoto (JP)

(72) Inventors: Takuya Nakai, Hirakata (JP); Takeo Nishikawa, Kyoto (JP); Makoto Ohashi, Uji (JP); Junichiro Yamada, Kizugawa (JP); Wataru Okada, Kizugawa (JP)

(73) Assignee: OMRON Corporation, Kyoto-shi (JP)

( * ) Notice: Subject to any disclaimer, the term of this patent is extended or adjusted under 35 U.S.C. 154(b) by 315 days.

(21) Appl. No.: 14/742,778

(22) Filed: Jun. 18, 2015

(65) Prior Publication Data
US 2015/0288189 A1 Oct. 8, 2015

Related U.S. Application Data

(63) Continuation of application No. PCT/JP2013/056412, filed on Mar. 8, 2013.

(30) Foreign Application Priority Data

Dec. 28, 2012 (JP) .................. 2012-288384

(51) Int. Cl.
*H02J 3/38* (2006.01)
*H02J 7/32* (2006.01)
(Continued)

(52) U.S. Cl.
CPC ............... *H02J 3/383* (2013.01); *H02J 3/32* (2013.01); *H02J 7/34* (2013.01); *H02J 7/35* (2013.01);
(Continued)

(58) Field of Classification Search
CPC .......... H02J 3/38; H02J 13/0096; H02J 7/007; H02J 7/34; H02J 7/35; H02J 3/32;
(Continued)

(56) References Cited

U.S. PATENT DOCUMENTS 6,081,104 A * 6/2000 Kern ...................... H02J 9/065
320/101
2010/0121511 A1 * 5/2010 Onnerud ............. B60L 11/1851
701/22

FOREIGN PATENT DOCUMENTS

JP 3581699 B2 7/2004

* cited by examiner

*Primary Examiner* — Jared Fureman
*Assistant Examiner* — Rafael Pacheco
(74) *Attorney, Agent, or Firm* — Metrolexis Law Group PLLC

(57) ABSTRACT

A power control apparatus includes: a direct current bus serving as a path for supplying direct current power; a first conversion apparatus that applies DC/DC conversion to direct current power from a power generator for generating power using natural energy, and outputs the resultant direct current power to the direct current bus; a second conversion apparatus that applies DC/DC conversion to the direct current power and charges a power storage unit with the resultant direct current power, and also applies DC/DC conversion to direct current power from the power storage unit and discharges the resultant direct current power to the direct current bus; a third conversion apparatus that applies DC/AC conversion to the direct current power from the direct current bus and supplies alternating current power to a power system and an alternating current load; and a controller that controls driving of the first to third conversion apparatuses.

20 Claims, 12 Drawing Sheets

(51) Int. Cl.
*H02J 7/35* (2006.01)
*H02J 3/32* (2006.01)
*H02J 7/34* (2006.01)

(52) U.S. Cl.
CPC ........... *Y02E 10/563* (2013.01); *Y02E 10/566* (2013.01); *Y02E 70/30* (2013.01); *Y10T 307/367* (2015.04)

(58) Field of Classification Search
CPC ..... Y02E 70/30; Y02E 10/566; Y02E 10/563; Y10T 307/367; H01L 31/042
See application file for complete search history.

POWER CONTROL APPARATUS, POWER CONTROL METHOD, PROGRAM, AND ENERGY MANAGEMENT SYSTEM

CROSS REFERENCE TO RELATED APPLICATIONS

This application is a Continuation of PCT Application No. PCT/JP2013/056412 filed on Mar. 8, 2013, and claims the priority of Japanese Patent Application No. 2012-288384 filed on Dec. 28, 2012, entitled "POWER CONTROL APPARATUS, POWER CONTROL METHOD, PROGRAM, AND ENERGY MANAGEMENT SYSTEM," the entire contents of both of which are incorporated herein by reference.

FIELD

The present disclosure relates to a power control apparatus, a power control method, a program, and an energy management system. In particular, the present disclosure relates to a power control apparatus, a power control method, a program, and an energy management system that enable more efficient use of generated power.

BACKGROUND

Conventionally, development of an energy management system that performs optimum power management has been taking place in order to efficiently use power supplied from a plurality of power sources, e.g., power from a power system that supplies commercial power, power generated through photovoltaics, and power reserved in a battery.

For example, JP 3581699B discloses a configuration of a system that selects one of a power conversion apparatus and a secondary battery as a connection destination of a power generation system in accordance with power generated by the power generation system.

FIG. 1 shows an exemplary configuration of an energy management system.

As shown in FIG. 1, an energy management system 11 is formed by connecting a power control apparatus 12 to a power system 14 via an ammeter 13, and connecting a photovoltaic (PV) device 15 and an alternating current (AC) load 17 to the power control apparatus 12.

The power control apparatus 12 includes a PV-use DC/DC converter 21 and a DC/AC converter 22. An AC-side terminal of the DC/AC converter 22 is connected to the power system 14. On the other hand, a DC-side terminal of the DC/AC converter 22 is connected to the PV device 15 via the PV-use DC/DC converter 21. Hereinafter, wiring which is connected to the DC-side terminal of the DC/AC converter 22 and via which direct current power is supplied to and from the PV-use DC/DC converter 21 is referred to as a DC bus 23.

In the energy management system 11, the PV-use DC/DC converter 21 applies DC/DC conversion to power generated by the PV device 15 and supplies the resultant power to the DC/AC converter 22 via the DC bus 23, and then the DC/AC converter 22 applies DC/AC conversion to the supplied power and supplies the resultant power to the AC load 17. Excess power is supplied to the power system 14 (reverse power flow).

JP 3581699B is an example of background art.

SUMMARY

Incidentally, in the mornings, evenings, and cloudy weather, the PV-use DC/DC converter 21 does not perform stable operation as the output from the PV device 15 is low. This leads to the inability to operate the power control apparatus 12.

For example, in order for the DC/AC converter 22 to output a voltage of 200 V, the PV-use DC/DC converter 21 generally needs to set the potential of the DC bus 23 to approximately 380 V.

Therefore, when the PV device 15 outputs low power, even if the PV-use DC/DC converter 21 boosts the potential of the DC bus 23 to approximately 380 V, output current is low. As a result, the PV-use DC/DC converter 21 cannot perform stable operation.

Furthermore, when the PV device 15 outputs low voltage, a boost ratio of the PV-use DC/DC converter 21 increases. As a result, the PV-use DC/DC converter 21 cannot perform stable operation, and the conversion efficiency decreases.

As indicated above, power generated by the PV device in the mornings, evenings, cloudy weather, and the like has not been used efficiently as it is not sufficient for operation of the power control apparatus 12.

The present disclosure has been made in view of the above conditions, and aims to enable more efficient use of generated power.

A power control apparatus according to one aspect of the present disclosure includes: a direct current bus serving as a path for supplying direct current power; a first conversion apparatus that applies DC/DC conversion to direct current power from a power generator for generating power using natural energy, and outputs the resultant direct current power to the direct current bus; a second conversion apparatus that applies DC/DC conversion to the direct current power from the direct current bus and charges a power storage unit with the resultant direct current power, and also applies DC/DC conversion to direct current power from the power storage unit and discharges the resultant direct current power to the direct current bus; a third conversion apparatus that applies DC/AC conversion to the direct current power from the direct current bus and supplies alternating current power to a power system and an alternating current load; and a controller that controls driving of the first to third conversion apparatuses. In accordance with output from the power generator, the controller sets a potential of the direct current bus to a first potential that enables the first conversion apparatus to perform stable operation, causes the second conversion apparatus to perform the charge, and suspends the third conversion apparatus.

A power control method or a program according to one aspect of the present disclosure is a power control method for a power control apparatus or a program executed by a computer that controls the power control apparatus, the power control apparatus including: a direct current bus serving as a path for supplying direct current power; a first conversion apparatus that applies DC/DC conversion to direct current power from a power generator for generating power using natural energy, and outputs the resultant direct current power to the direct current bus; a second conversion apparatus that applies DC/DC conversion to the direct current power from the direct current bus and charge a power storage unit with the resultant direct current power, and also applies DC/DC conversion to direct current power from the power storage unit and discharges the resultant direct current power to the direct current bus; and a third conversion apparatus that applies DC/AC conversion to the direct current power from the direct current bus and supplies alternating current power to a power system and an alternating current load. The power control method or the program includes a step of, in accordance with output from the power generator, setting a potential of the direct current bus to a potential that enables the first conversion apparatus to perform stable operation, causing the second conversion apparatus to perform the charge, and suspending the third conversion apparatus.

An energy management system according to one aspect of the present disclosure includes: a power generator that generates power using natural energy; a power storage unit for storing power; a direct current bus serving as a path for supplying direct current power; a first conversion apparatus that applies DC/DC conversion to direct current power from the power generator, and outputs the resultant direct current power to the direct current bus; a second conversion apparatus that applies DC/DC conversion to the direct current power from the direct current bus and charges the power storage unit with the resultant direct current power, and also applies DC/DC conversion to direct current power from the power storage unit and discharges the resultant direct current power to the direct current bus; a third conversion apparatus that applies DC/AC conversion to the direct current power from the direct current bus and supplies alternating current power to a power system and an alternating current load; and a controller that controls driving of the first to third conversion apparatuses. In accordance with output from the power generator, the controller sets a potential of the direct current bus to a potential that enables the first conversion apparatus to perform stable operation, causes the second conversion apparatus to perform the charge, and suspends the third conversion apparatus.

In one aspect of the present disclosure, in accordance with the output from the power generator, the potential of the direct current bus is set to the potential that enables the first conversion apparatus to perform stable operation, the second conversion apparatus performs the charge, and the third conversion apparatus is suspended.

According to one aspect of the present disclosure, generated power can be used more efficiently.

DETAILED DESCRIPTION

The following describes a specific embodiment incorporating the present technique in detail with reference to the drawings.

[Exemplary Configuration of Energy Management System]

Figure 1:
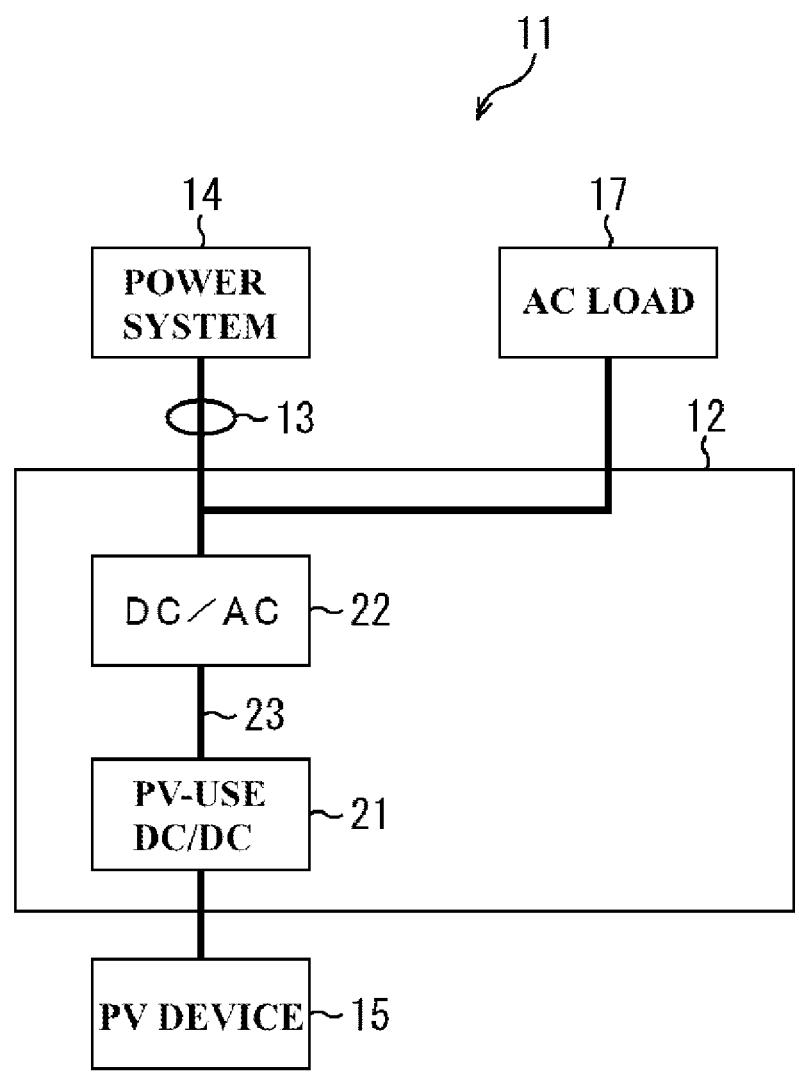
FIG. 1 is a block diagram showing an exemplary configuration of an energy management system.
Figure 2:
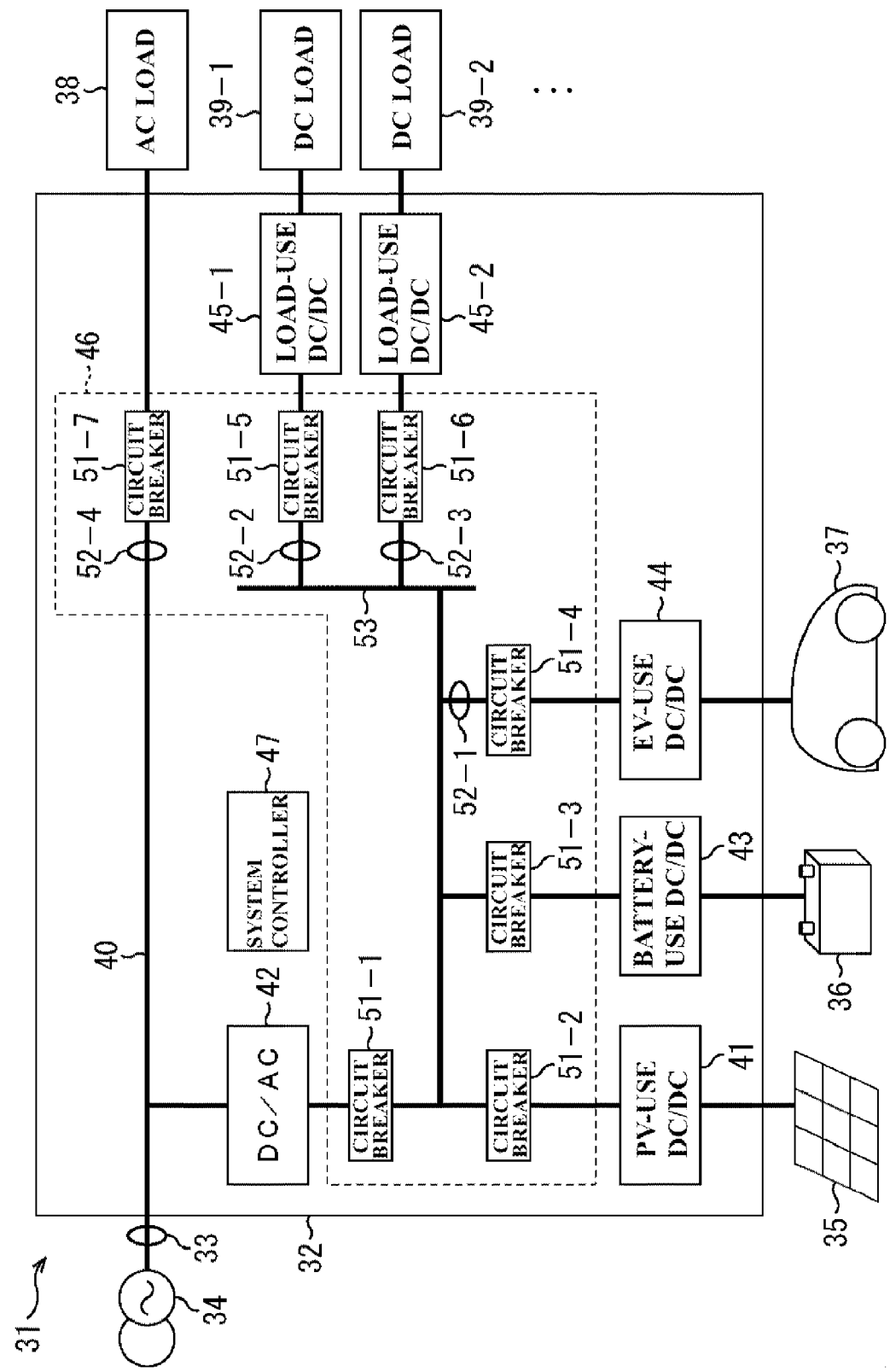
FIG. 2 is a block diagram showing an exemplary configuration of an embodiment of an energy management system incorporating the present technique.

FIG. 2 is a block diagram showing an exemplary configuration of an embodiment of an energy management system incorporating the present technique.

In FIG. 2, an energy management system 31 is formed, as a photovoltaic system, by connecting a power control apparatus 32 to a power system 34 via an ammeter 33, and connecting a PV device 35, a battery 36, an electric vehicle (EV) 37, an AC load 38, and DC loads 39-1 and 39-2 to the power control apparatus 32.

The power control apparatus 32 is formed as a so-called power conditioner, and performs control to supply power supplied from a plurality of power sources (the power system 34, the PV device 35, the battery 36, and the EV 37) connected to the power control apparatus 32 to a plurality of loads (the AC load 38 and the DC loads 39-1 and 39-2) connected to the power control apparatus 32.

The ammeter 33 measures power that is supplied from the power control apparatus 32 to the power system 34 (reverse power flow). The energy management system 31 supplies alternating current power to the power system 34.

The PV device 35 is formed like, for example, a panel with a plurality of photovoltaic cell modules connected thereto. The PV device 35 generates power in accordance with the amount of received sunlight, and supplies the generated power to the power control apparatus 32. The battery 36 stores power supplied from the power control apparatus 32, and supplies stored power to the power control apparatus 32. The EV 37 is connected to the power control apparatus 32 as appropriate for use of the EV 37 by a user, and has a built-in battery that stores power supplied from the power control apparatus 32.

The AC load 38 is a device that is driven while consuming alternating current power. The DC loads 39-1 and 39-2 are devices that are driven while consuming direct current power. Although two DC loads 39-1 and 39-2 are connected to the power control apparatus 32 in the exemplary configuration shown in FIG. 2, the number of DC loads can be increased or reduced.

The power control apparatus 32 includes a PV-use DC/DC converter 41, a DC/AC converter 42, a battery-use DC/DC converter 43, an EV-use DC/DC converter 44, load-use DC/DC converters 45-1 and 45-2, a distribution board 46, and a system controller 47. The distribution board 46 houses circuit breakers 51-1 to 51-6, ammeters 52-1 to 52-4, and a DC bus 53.

In the power control apparatus 32, an AC-side terminal of the DC/AC converter 42 is connected to a power line 40 that connects the power system 34 and the AC load 38, and a DC-side terminal of the DC/AC converter 42 is connected via the circuit breaker 51-1 to a DC bus 53 that serves as a path for supplying direct current power. The PV device 35 is connected to the PV-use DC/DC converter 41 that is connected via the circuit breaker 51-2 to the DC bus 53. Similarly, the battery 36 is connected to the battery-use DC/DC converter 43 that is connected via the circuit breaker 51-3 to the DC bus 53, and the EV 37 is connected to the EV-use DC/DC converter 44 that is connected via the circuit breaker 51-4 and the ammeter 52-1 to the DC bus 53.

The DC load 39-1 is connected to the load-use DC/DC converter 45-1 that is connected via the circuit breaker 51-5 and the ammeter 52-2 to the DC bus 53, and the DC load 39-2 is connected to the load-use DC/DC converter 45-2 that is connected via the circuit breaker 51-6 and the ammeter 52-3 to the DC bus 53. The AC load 38 is connected via the circuit breaker 51-7 and the ammeter 52-4 to the DC/AC converter 42.

The PV-use DC/DC converter 41 applies DC/DC conversion to power generated by the PV device 35 (increases and reduces voltage thereof) so that the resultant power has a predetermined voltage, and outputs the resultant power to the DC bus 53. The PV-use DC/DC converter 41 can perform MPPT control in which the maximum output point is tracked so as to obtain maximum power from the PV device 35.

The DC/AC converter 42 applies DC/AC conversion to direct current power supplied via the DC bus 53. Via the power line 40, the DC/AC converter 42 supplies the obtained alternating current power to the AC load 38, and causes a reverse flow of the obtained alternating current power to the power system 34. The DC/AC converter 42 also applies AC/DC conversion to alternating current power supplied from the power system 34, and outputs the obtained direct current power to the DC bus 53.

The battery-use DC/DC converter 43 applies DC/DC conversion to power reserved in the battery 36 (increases and reduces voltage thereof) and outputs (discharges) the resultant power to the DC bus 53. The battery-use DC/DC converter 43 also applies DC/DC conversion to power supplied via the DC bus 53 and charges the battery 36 with the resultant power.

When the EV 37 is connected to the power control apparatus 32, the EV-use DC/DC converter 44 applies DC/DC conversion to power reserved in the EV 37 and outputs (discharges) the resultant power to the DC bus 53, and also applies DC/DC conversion to power supplied via the DC bus 53 and charges the EV 37 with the resultant power.

The load-use DC/DC converters 45-1 and 45-2 apply DC/DC conversion to power supplied via the DC bus 53 so that the resultant power has voltage necessary for driving the DC loads 39-1 and 39-2 that are connected to the load-use DC/DC converters 45-1 and 45-2, respectively, and supplies the resultant power to the DC loads 39-1 and 39-2, respectively.

The system controller 47 controls the entirety of the energy management system 31 by controlling blocks composing the power control apparatus 32 based on the currents measured by the ammeters 33 and 52-1 to 52-4, the state of power generation by the PV device 35, the charged state of the battery 36, and the like.

The system controller 47 also controls, for example, the battery-use DC/DC converter 43 to charge or discharge the battery 36 in accordance with the output from the PV device 35.

It should be noted that, in FIG. 2, illustration of wiring that connects the system controller 47 and the blocks is omitted.

Figure 3:
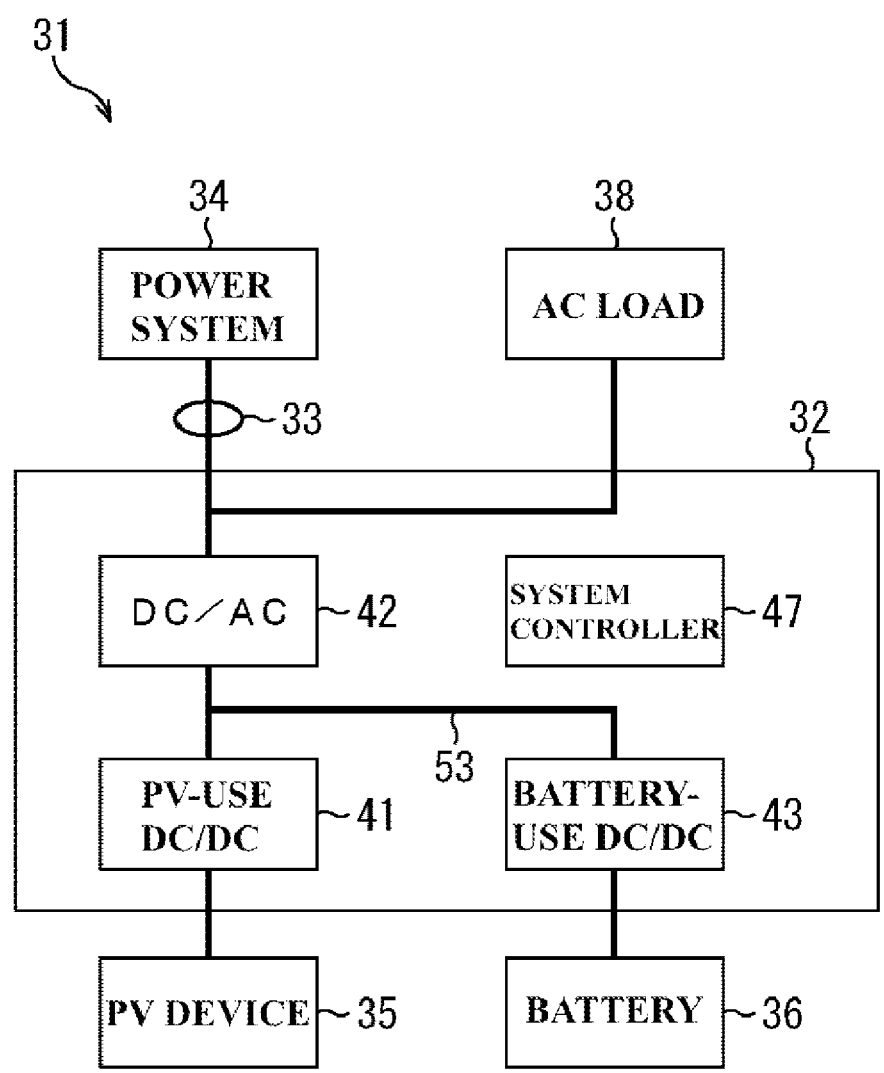
FIG. 3 shows an exemplary configuration of an energy management system in a simplified manner.

For the sake of simplicity, the following description will be given using an exemplary configuration of the energy management system 31 shown in FIG. 3. In the energy management system 31 shown in FIG. 3, constituents that correspond to constituents of the energy management system 31 shown in FIG. 2 are given the same reference numerals thereas.

[Processing for Controlling Charge and Discharge of Battery]

Figure 4:
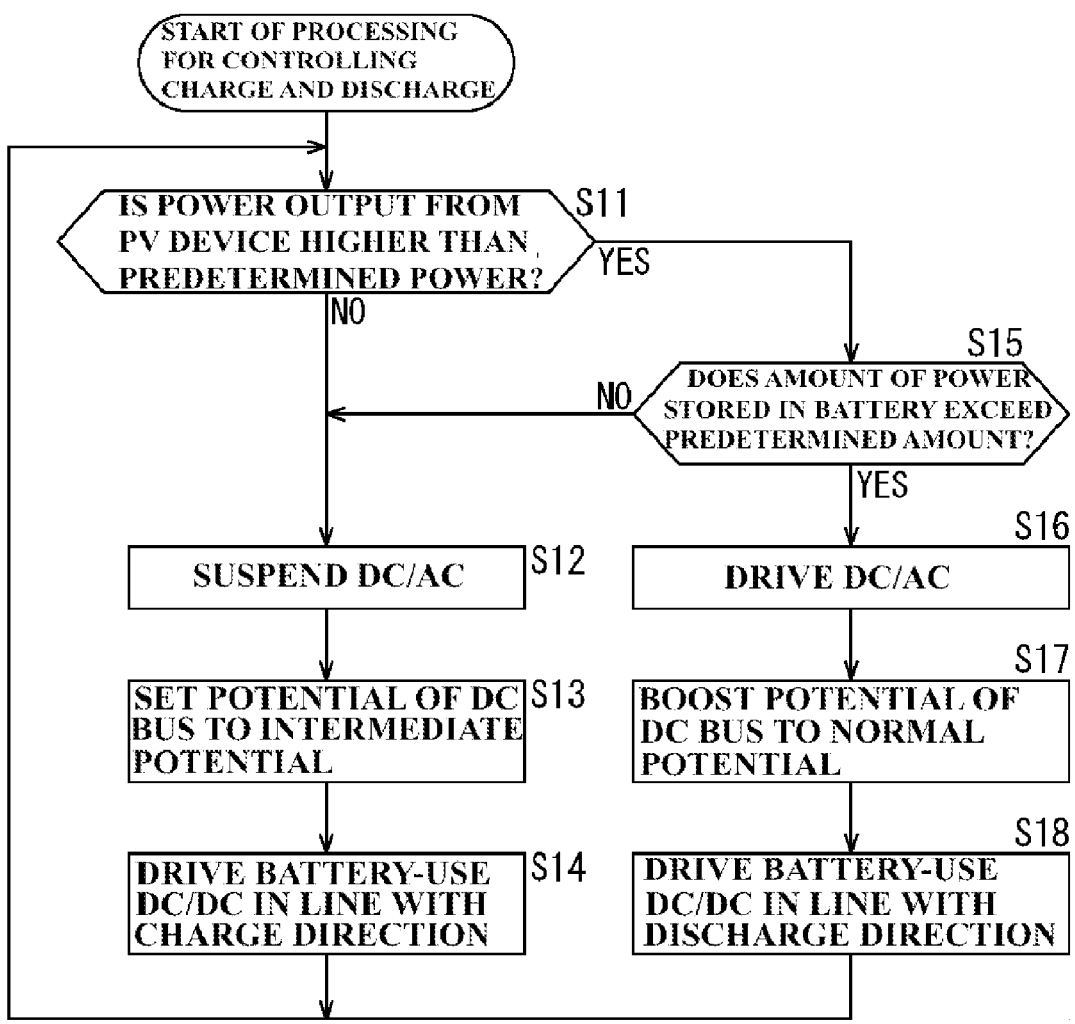
FIG. 4 is a flowchart for describing processing for controlling charge and discharge.

A description is now given of processing for controlling charge and discharge of the battery in the energy management system 31 with reference to a flowchart shown in FIG. 4. This processing for controlling charge and discharge is executed when the DC/DC converter 41 applies DC/DC conversion to power generated by the PV device 35 and outputs the resultant power to the DC bus 53.

In step S11, the system controller 47 determines whether power output from the PV device 35 is higher than a predetermined power.

The predetermined power denotes power with which stable output current can be obtained as a result of DC/DC conversion applied by the PV-use DC/DC converter 41 to the power output from the PV device 35 after the potential of the DC bus 53 has been boosted to approximately 380 V. It should be noted that, in order for the DC/AC converter 42 to output an AC voltage of 200 V, the potential of the DC bus 53 needs to be set to approximately 380 V.

If it is determined in step S11 that the power output from the PV device 35 is, for example, approximately 100 W, that is to say, the power output from the PV device 35 is not higher than the predetermined power, processing proceeds to step S12, and the system controller 47 suspends the DC/AC converter 42.

Then, in step S13, the system controller 47 controls the PV-use DC/DC converter 41 so as to set the potential of the DC bus 53 to an intermediate potential. The intermediate potential denotes a potential with which stable output current can be obtained, that is to say, a potential that enables the PV-use DC/DC converter 41 to perform stable operation, even when the power output from the PV device 35 is lower than the predetermined power.

For example, in a case where the potential of the DC bus 53 is set to approximately 380 V, an output current of approximately 0.27 A is obtained when the PV device 35 outputs a power of 100 W. This does not enable the PV-use DC/DC converter 41 to perform stable operation. On the other hand, in a case where the potential of the DC bus 53 is set to 60 V, i.e., the intermediate potential, an output current of approximately 1.7 A is obtained when the PV device 35 outputs a power of 100 W. This enables the PV-use DC/DC converter 41 to perform stable operation.

Then, in step S14, the system controller 47 drives the battery-use DC/DC converter 43 in line with a charge direction so as to apply DC/DC conversion to the power output from the PV-use DC/DC converter 41 to the DC bus 53 and charge the battery 36 with the resultant power.

Figure 5:
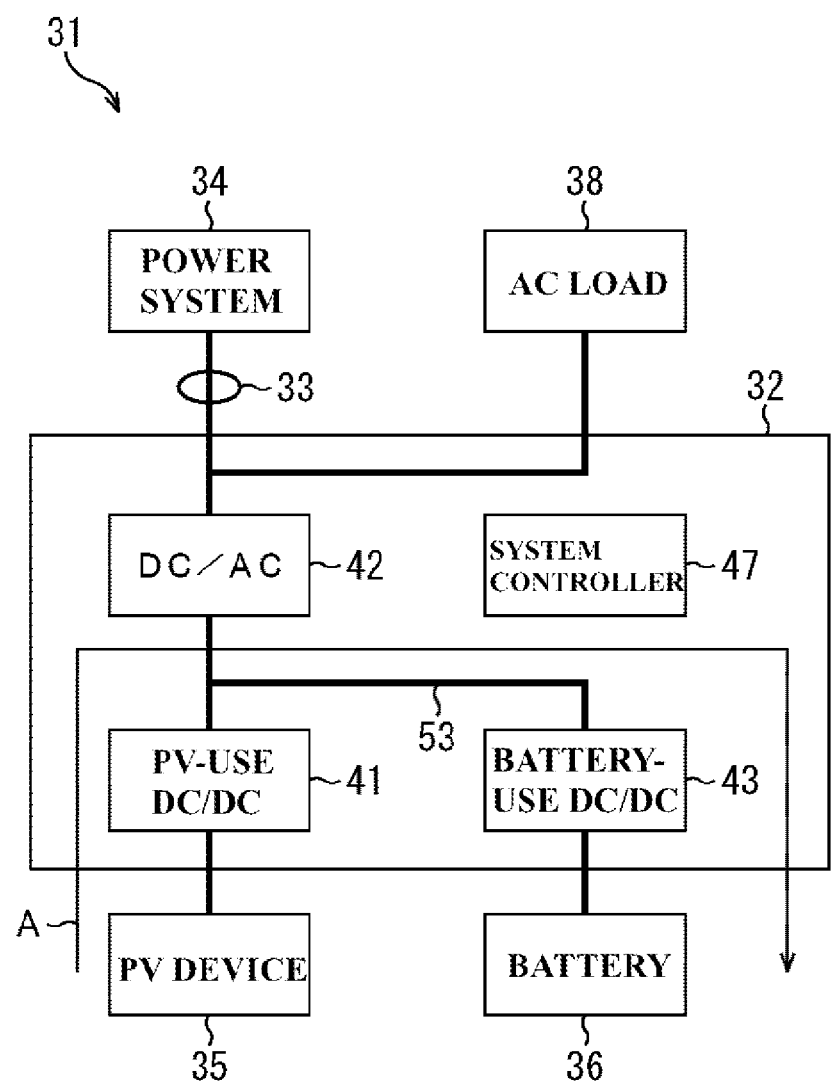
FIG. 5 shows the flow of power at the time of charge.

That is to say, in the energy management system 31, if the power output from the PV device 35 is not higher than the predetermined power, the PV-use DC/DC converter 41 applies DC/DC conversion to the power generated by the PV device 35 and supplies the resultant power to the battery-use DC/DC converter 43 via the DC bus 53, and then the battery-use DC/DC converter 43 applies DC/DC conversion to the supplied power and charges the battery 36 with the resultant power, as indicated by an arrow A in FIG. 5.

On the other hand, if it is determined in step S11 that the power output from the PV device 35 is higher than the predetermined power, processing proceeds to step S15, and the system controller 47 determines whether the amount of power stored in the battery 36 exceeds a predetermined amount. Here, whether the amount of power stored in the battery 36 is equal to the maximum capacity of the battery 36 may be determined.

If it is determined in step S15 that the amount of power stored in the battery 36 does not exceed the predetermined amount, processing proceeds to step S12, and then the battery 36 is charged.

On the other hand, if it is determined in step S15 that the amount of power stored in the battery 36 exceeds the predetermined amount, processing proceeds to step S16, and the system controller 47 drives the DC/AC converter 42.

Then, in step S17, the system controller 47 controls the PV-use DC/DC converter 41 so as to boost the potential of the DC bus 53 to a normal voltage. The normal potential denotes a potential that enables the DC/AC converter 42 to supply an alternating current power of a prescribed voltage to the AC load 38 and the power system 34. For example, in order for the DC/AC converter 42 to output an AC voltage of 200 V, a normal potential of approximately 380 V is required.

Then, in step S18, the system controller 47 drives the battery-use DC/DC converter 43 in line with a discharge direction so as to apply DC/DC conversion to the power stored in the battery 36 and discharge the resultant power to the DC bus 53.

At this time, the system controller 47 causes the DC/AC converter 42 to apply DC/AC conversion to a combination of the power output from the PV-use DC/DC converter 41 (the power output from the PV device 35) and the power discharged from the battery 36 by the battery-use DC/DC converter 43.

Figure 6:
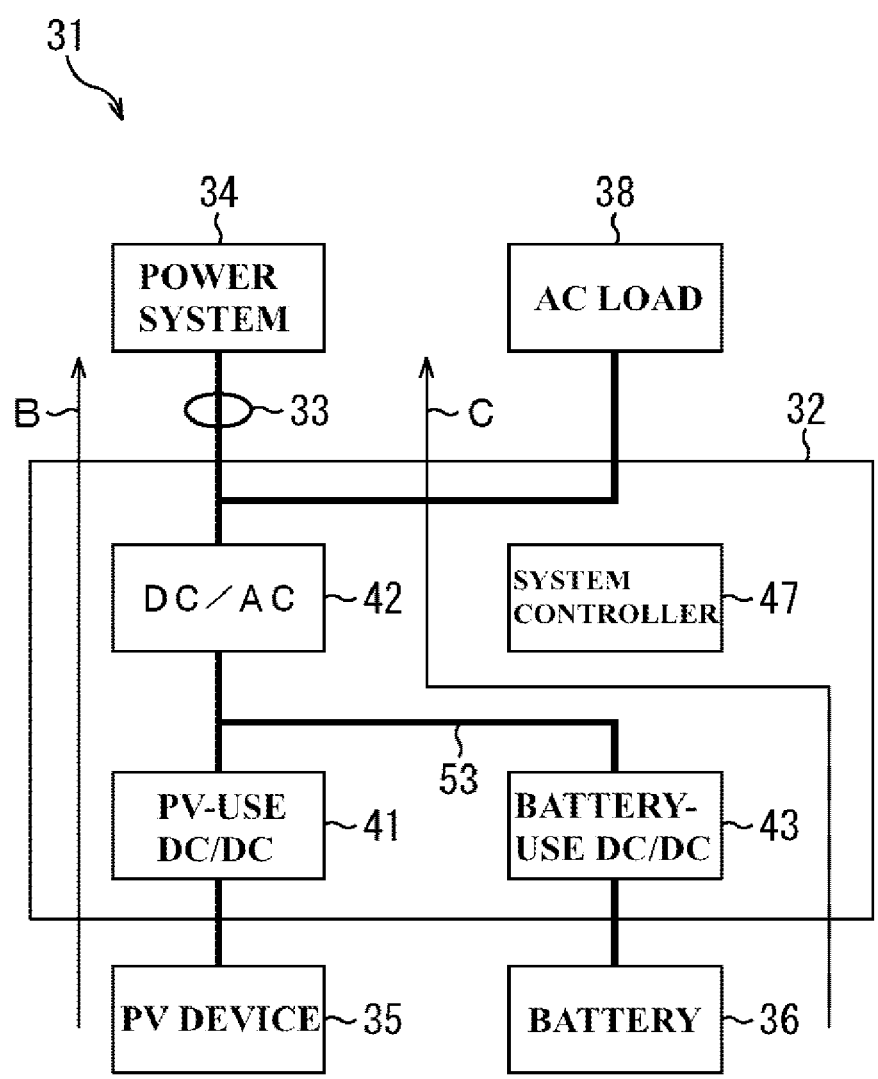
FIG. 6 shows the flow of power at the time of discharge.

That is to say, in the energy management system 31, if the power output from the PV device 35 is higher than the predetermined power and the amount of power stored in the battery 36 exceeds the predetermined amount, the following operations are carried out. As indicated by an arrow B in FIG. 6, the PV-use DC/DC converter 41 applies DC/DC conversion to the power generated by the PV device 35 and supplies the resultant power to the DC/AC converter 42 via the DC bus 53, and the DC/AC converter 42 applies DC/AC conversion to the supplied power. Furthermore, as indicated by an arrow C in FIG. 6, the battery-use DC/DC converter 43 applies DC/DC conversion to the power discharged from the battery 36 and supplies the resultant power to the DC/AC converter 42 via the DC bus 53, and the DC/AC converter 42 applies DC/AC conversion to the supplied power.

Through the above-described processing, if the power output from the PV device 35 is lower than the predetermined power, the potential of the DC bus 53 is set to the intermediate potential, and the battery 36 is charged with power from the DC bus 53 set to the intermediate potential. In this way, even if the generated power is low, the PV-use DC/DC converter 41 can perform stable operation. This enables the power control apparatus 32 to operate. Furthermore, as power generated in the mornings, evenings, cloudy weather, and the like is temporarily stored, the power can be used more efficiently without being wasted.

[Another Example of Processing for Controlling Charge and Discharge]

Figure 7:
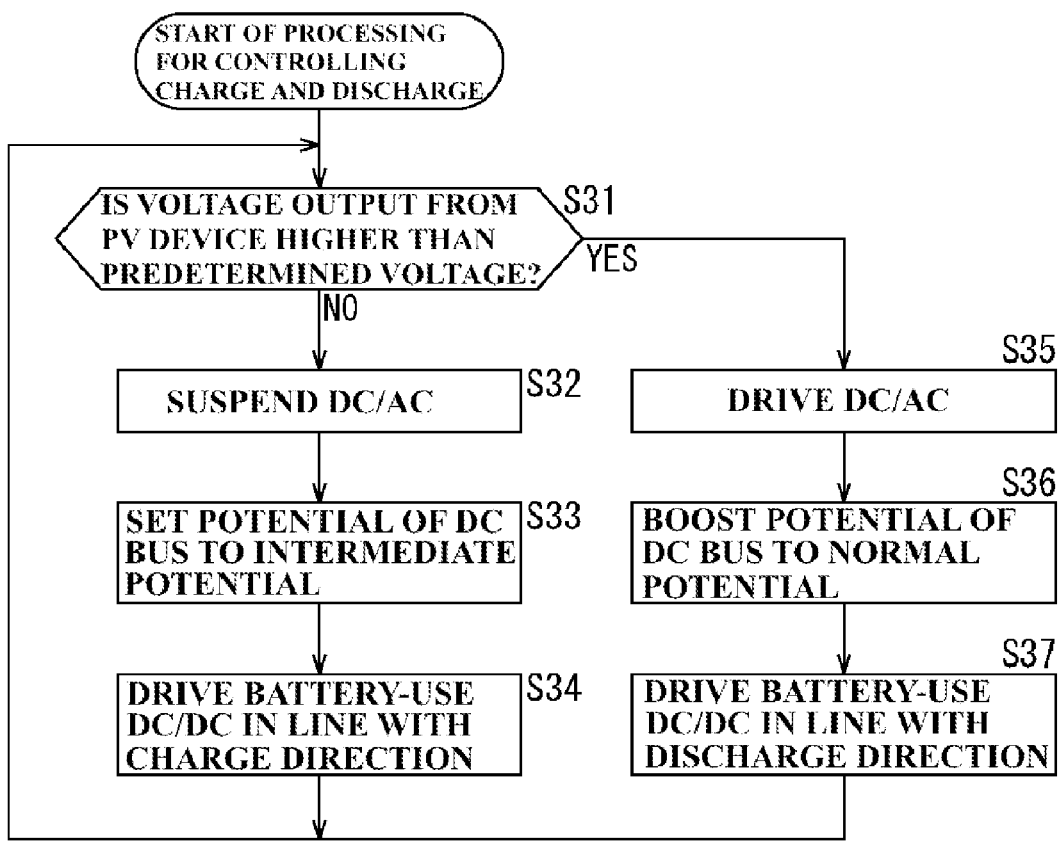
FIG. 7 is a flowchart for describing another example of processing for controlling charge and discharge.

A description is now given of another example of processing for controlling charge and discharge in the energy management system 31 with reference to a flowchart shown in FIG. 7. This processing for controlling charge and discharge is also started when, for example, the DC/DC converter 41 applies DC/DC conversion to power generated by the PV device 35 and outputs the resultant power to the DC bus 53.

In step S31, the system controller 47 determines whether voltage output from the PV device 35 is higher than a predetermined voltage.

The predetermined voltage denotes voltage that is necessary for stably boosting the potential of the DC bus 53 to, for example, approximately 380 V when the PV-use DC/DC converter 41 applies DC/DC conversion to power output from the PV device 35. The predetermined voltage is, for example, 60 V.

If it is determined in step S31 that the voltage output from the PV device 35 is not higher than the predetermined voltage, processing proceeds to step S32, and the system controller 47 suspends the DC/AC converter 42.

Then, in step S33, the system controller 47 controls the PV-use DC/DC converter 41 so as to set the potential of the DC bus 53 to an intermediate potential. The intermediate potential denotes a potential that enables stable boost even when the voltage output from the PV device 35 is lower than the predetermined voltage, that is to say, a potential that enables the PV-use DC/DC converter 41 to perform stable operation.

For example, in a case where the potential of the DC bus 53 is set to approximately 380 V, the boost ratio increases when the voltage output from the PV device 35 is lower than 60 V. As a result, the PV-use DC/DC converter 41 cannot perform stable operation, and the conversion efficiency decreases. On the other hand, in a case where the potential of the DC bus 53 is set to 120 V, i.e., the intermediate potential, the boost ratio decreases even when the voltage output from the PV device 35 is lower than 60 V. As a result, the PV-use DC/DC converter 41 can perform stable operation, and the conversion efficiency can be increased.

Then, in step S34, the system controller 47 drives the battery-use DC/DC converter 43 in line with the charge direction so as to apply DC/DC conversion to the power output from the PV-use DC/DC converter 41 to the DC bus 53 and charge the battery 36 with the resultant power.

Figure 8:
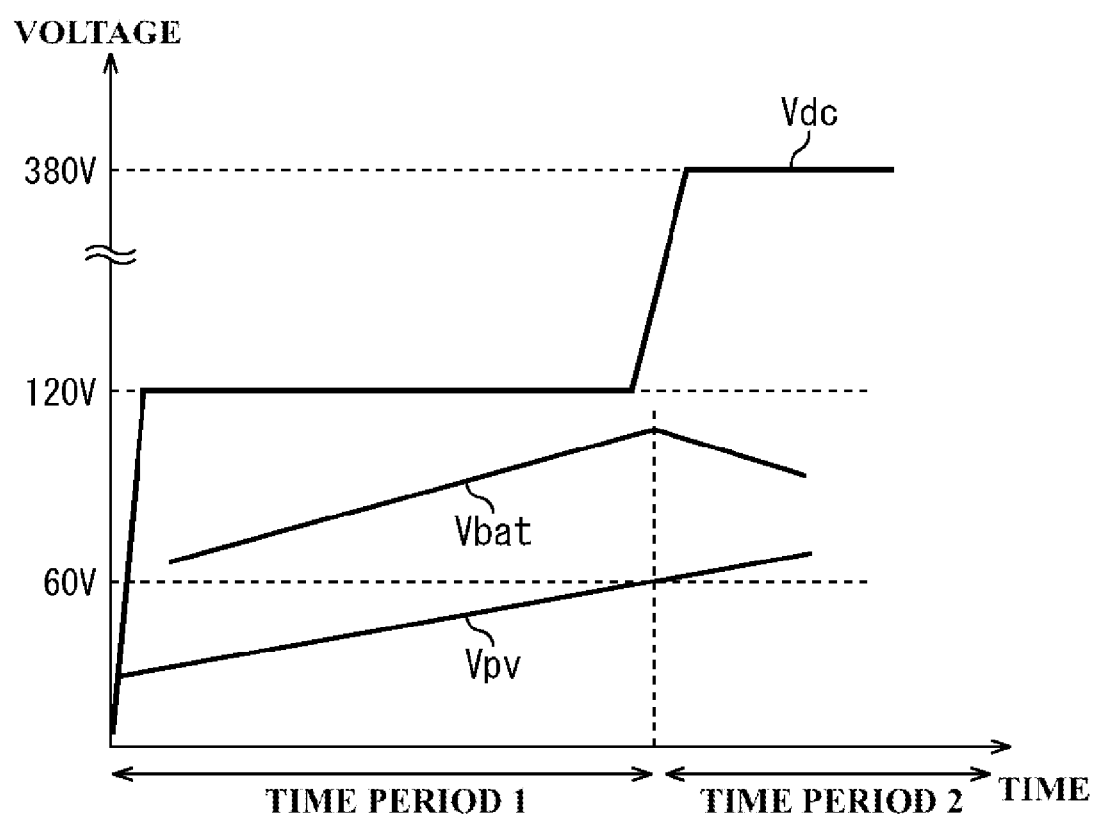
FIG. 8 is a diagram for describing a potential of a DC bus.

For example, as shown in FIG. 8, in a time period 1, voltage Vpv output from the PV device 35 increases with time, but is lower than the predetermined voltage, i.e., 60 V. At this time, a potential Vdc of the DC bus 53 is set to 120 V, i.e., the intermediate potential. It should be noted that, in the time period 1, as the battery 36 is charged, charging voltage Vbat of the battery 36 also increases with time.

As shown in FIG. 8, the charging voltage Vbat of the battery 36 is approximately 110 V at most, that is to say, the charging voltage Vbat does not become so high. Therefore, the battery 36 may be composed of an electric double-layer capacitor.

On the other hand, if it is determined in step S31 that the voltage output from the PV device 35 is higher than the predetermined voltage, processing proceeds to step S35, and the system controller 47 drives the DC/AC converter 42.

Then, in step S36, the system controller 47 controls the PV-use DC/DC converter 41 so as to boost the potential of the DC bus 53 to a normal voltage (approximately 380 V).

Then, in step S37, the system controller 47 drives the battery-use DC/DC converter 43 in line with the discharge direction so as to apply DC/DC conversion to the power stored in the battery 36 and discharge the resultant power to the DC bus 53.

At this time, the system controller 47 causes the DC/AC converter 42 to apply DC/AC conversion to a combination of the power output from the PV-use DC/DC converter 41 (the power output from the PV device 35) and the power discharged from the battery 36 by the battery-use DC/DC converter 43.

For example, as shown in FIG. 8, in a time period 2 that follows the time period 1, the voltage Vpv output from the PV device 35 is higher than the predetermined voltage, i.e., 60 V. At this time, the potential Vdc of the DC bus 53 is set to 380 V, i.e., the normal voltage. In the time period 2, as the battery 36 is discharged, the charging voltage Vbat of the battery 36 decreases with time.

Through the above-described processing, if the voltage output from the PV device 35 is lower than the predetermined voltage, the potential of the DC bus 53 is set to the intermediate potential, and the battery 36 is charged with power from the DC bus 53 set to the intermediate potential. In this way, even if the generated power is low, the PV-use DC/DC converter 41 can perform stable operation. This enables the power control apparatus 32 to operate. Furthermore, as power generated in the mornings, evenings, cloudy weather, and the like is temporarily stored, the power can be used more efficiently without being wasted.

Figure 9:
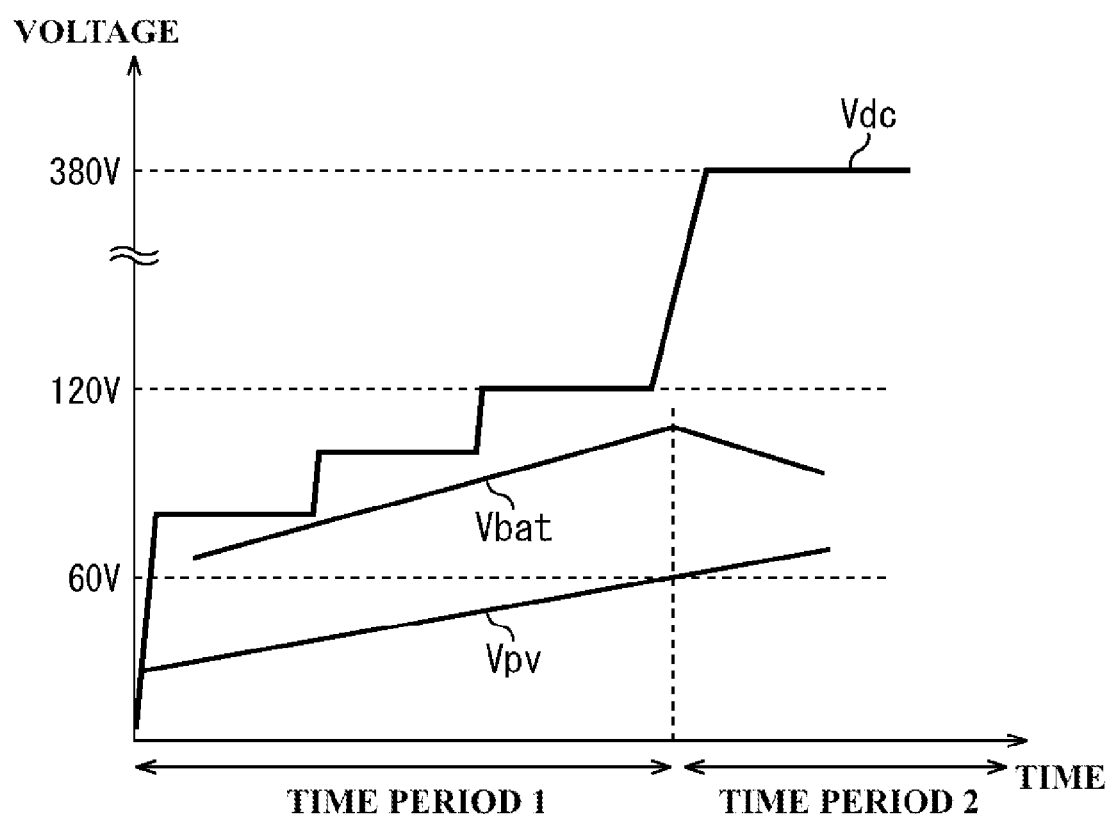
FIG. 9 is a diagram for describing a potential of a DC bus.

Although the intermediate potential is restricted to one voltage value such as 60 V and 120 V in the foregoing description, the system controller 47 may set the intermediate potential in a stepwise manner. For example, as shown in FIG. 9, in the time period 1, the potential Vdc of the DC bus 53 may be set to a three-step intermediate potential with an increase in the voltage Vpv output from the PV device 35.

In this way, the PV-use DC/DC converter 41 has a stabilized, lower boost ratio in the time period 1, and the conversion efficiency can be further increased. Consequently, the efficiency of charge of the battery 36 can be increased.

[Still Another Exemplary Configuration of Energy Management System]

Figure 10:
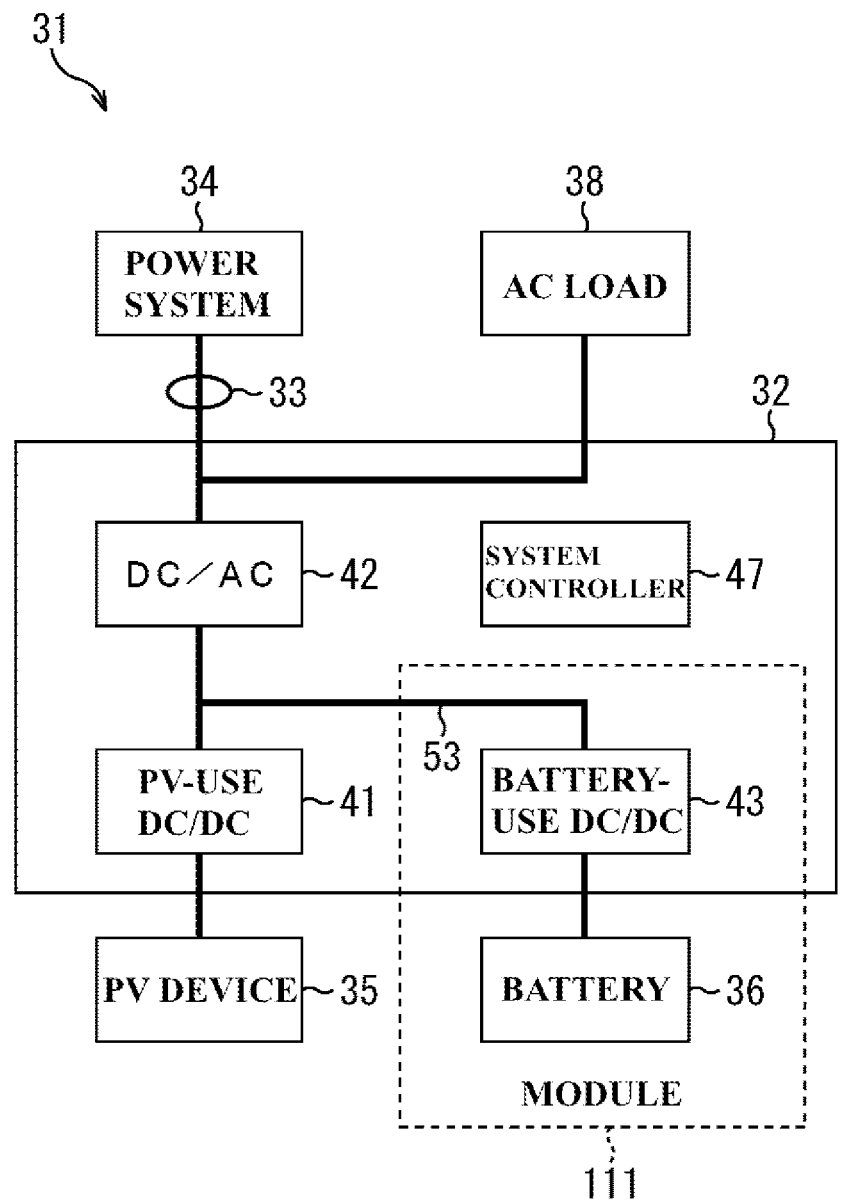
FIG. 10 shows another exemplary configuration of an energy management system.

In the foregoing description, the battery 36 serving as a power storage unit and the battery-use DC/DC converter 43 that charges and discharges the battery 36 are configured separately. Alternatively, as shown in FIG. 10, the battery 36 and the battery-use DC/DC converter 43 may be included in a module 111 that is attachable to and detachable from the power control apparatus 32.

In this configuration, a program for controlling the module 111 is installed into the system controller 47.

Figure 11:
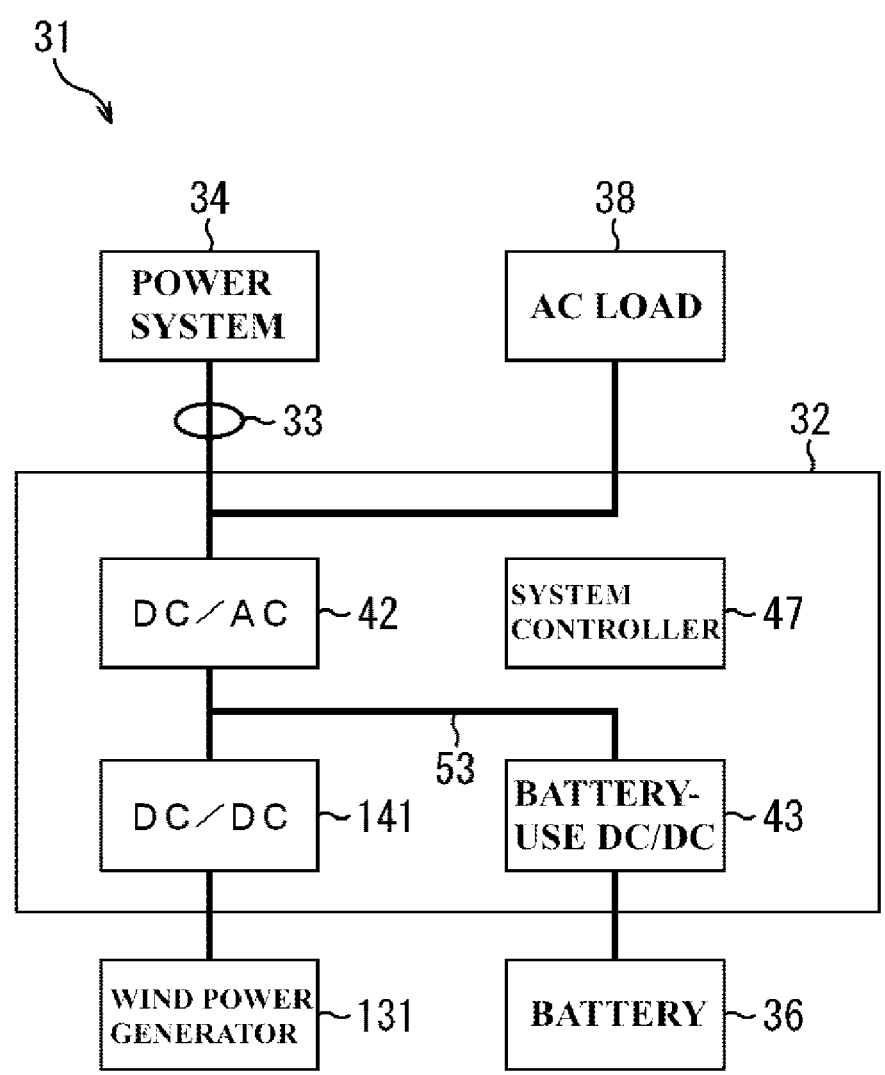
FIG. 11 shows still another exemplary configuration of an energy management system.

Furthermore, in the foregoing description, the PV device 35 that generates power in accordance with the amount of received sunlight is connected to the power control apparatus 32. Alternatively, for example, a wind power generator 131 that generates power using wind power may be connected to the power control apparatus 32 in place of the PV device 35, as shown in FIG. 11. In this case, a DC/DC converter 141 applies DC/DC conversion to the power generated by the wind power generator 131 so that the resultant power has a predetermined voltage, and outputs the resultant power to the DC bus 53.

It should be noted that a power generator, a fuel cell, and the like that generate power using biomass and other forms of natural energy may be connected to the power control apparatus 32 in place of the wind power generator 131.

Incidentally, the above-described processing sequences can be executed not only by hardware, but also by software. In a case where the processing sequences are executed by software, a program composing the software is installed from a recording medium into, for example, a computer built in dedicated hardware, or a general-purpose personal computer that can execute various types of functions by installing various types of programs.

[Exemplary Configuration of General-Purpose Personal Computer]

Figure 12:
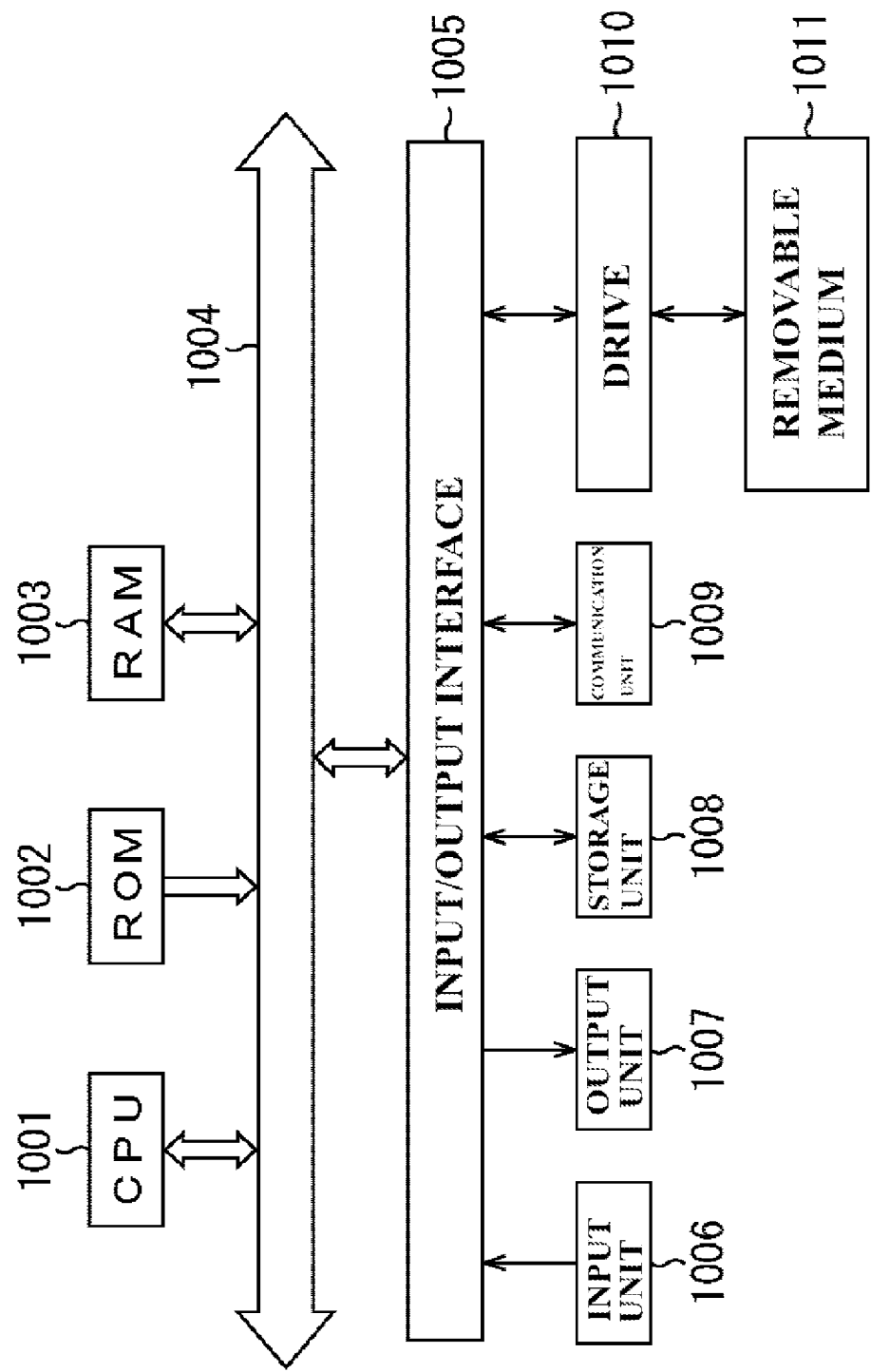
FIG. 12 is a diagram for describing an exemplary configuration of a general-purpose personal computer.

FIG. 12 shows an exemplary configuration of a general-purpose personal computer. This personal computer has a built-in central processing unit (CPU) 1001. An input/output interface 1005 is connected to the CPU 1001 via a bus 1004. A read-only memory (ROM) 1002 and a random-access memory (RAM) 1003 are connected to the bus 1004.

An input unit 1006, an output unit 1007, a storage unit 1008, and a communication unit 1009 are connected to the input/output interface 1005. The input unit 1006 is composed of input devices, such as a keyboard and a mouse, that enable the user to input operation commands. The output unit 1007 outputs images of a processing operation screen and a processing result to a display device. The storage unit 1008 is composed of, for example, a hard disk drive storing programs and various types of data. The communication unit 1009 is composed of, for example, a local area network (LAN) adapter, and executes communication processing via a network, a typical example of which is the Internet. A drive 1010 is also connected that performs reading and writing of data from and to a removable medium 1011 such as a magnetic disk (including a flexible disk), an optical disc (including a compact disc read-only memory (CD-ROM) and a digital versatile disc (DVD)), a magneto-optical disc (including MiniDisc (MD)), and a semiconductor memory.

The CPU 1001 executes various types of processing in accordance with programs stored in the ROM 1002, or programs that have been read from the removable medium 1011 such as a magnetic disk, an optical disc, a magneto-optical disc, and a semiconductor memory, installed into the storage unit 1008, and loaded from the storage unit 1008 to the RAM 1003. The RAM 1003 also stores, for example, data necessary for the CPU 1001 to execute various types of processing as appropriate.

In the computer configured in the foregoing manner, the above-described processing sequences are executed by, for example, the CPU 1001 loading the programs stored in the storage unit 1008 to the RAM 1003 via the input/output interface 1005 and the bus 1004 and executing the loaded programs.

The programs executed by the computer (CPU 1001) can be provided, for example, by recording the same into the removable medium 1011 serving as a packaged medium and the like. The programs can also be provided via a wired or wireless transmission medium such as a local area network, the Internet, and digital satellite broadcasting.

In the computer, the programs can be installed into the storage unit 1008 via the input/output interface 1005 by loading the removable medium 1011 to the drive 1010. The programs can also be received from the communication unit 1009 via a wired or wireless transmission medium and installed into the storage unit 1008. Alternatively, the programs can be preinstalled into the ROM 1002 and the storage unit 1008.

It should be noted that the programs executed by the computer may be processed chronologically in line with the order described in the present specification, may be processed in parallel, or may be processed at necessary timings such as when they are called up. Furthermore, the programs may be processed by one CPU, or may be processed by a plurality of CPUs in the form of distributed processing. It should be noted that, in the present specification, a system denotes the entirety of an apparatus composed of a plurality of apparatuses.

Furthermore, the above-described embodiment is not restrictive, and various changes are possible without departing from the scope of the concept of the present disclosure.

The invention claimed is:

1. A power control apparatus, comprising:
a direct current bus supplying direct current power;
a first conversion apparatus that applies DC/DC conversion to direct current power from a power generator, and outputs the resultant direct current power to the direct current bus;
a second conversion apparatus that applies DC/DC conversion to the direct current power from the direct current bus, charges a power storage unit with the resultant direct current power, applies DC/DC conversion to direct current power from the power storage unit, and discharges the resultant direct current power to the direct current bus;

a third conversion apparatus that applies DC/AC conversion to the direct current power from the direct current bus and supplies alternating current power to a power system and an alternating current load; and a controller configured with a program to control driving of the first to third conversion apparatuses, wherein when a measured output from the power generator is lower than a predetermined threshold, the controller is configured with the program to perform operations comprising:

setting a potential of the direct current bus to a first potential, causing the second conversion apparatus to perform the charge, and suspending the third conversion apparatus, the first potential enabling the first conversion apparatus to perform stable operation.

2. The power control apparatus according to claim 1, wherein the measured output is a power output and the predetermined threshold is a power threshold.

3. The power control apparatus according to claim 2, wherein
when an amount of power stored in the power storage unit exceeds a predetermined amount, the controller is configured with the program to perform operations further comprising:
boosting the potential of the direct current bus to a second potential, causes the second conversion apparatus to perform the discharge, and
driving the third conversion apparatus, the second potential enabling the third conversion apparatus to supply an alternating current power of a prescribed voltage to the power system and the alternating current load.

4. The power control apparatus according to claim 3, wherein
the controller is configured with the program to perform operations further comprising causing the third conversion apparatus to apply DC/AC conversion to a combination of the power output from the first conversion apparatus and the power discharged by the second conversion apparatus.

5. The power control apparatus according to claim 1, wherein the measured output is a voltage output and the predetermined threshold is a voltage threshold.

6. The power control apparatus according to claim 5, wherein
when the voltage output from the power generator exceeds a predetermined voltage, the controller is configured with the program to perform operations further comprising:
boosting the potential of the direct current bus to a second potential,
causing the second conversion apparatus to perform the discharge, and
driving the third conversion apparatus, the second potential enabling the third conversion apparatus to supply an alternating current power of a prescribed voltage to the power system and the alternating current load.

7. The power control apparatus according to claim 6, wherein
the controller is configured with the program to perform operations further comprising causing the third conversion apparatus to apply DC/AC conversion to a combination of the resultant direct current power output from the first conversion apparatus and the resultant direct current power discharged by the second conversion apparatus.

8. The power control apparatus according to claim 1, wherein the controller is configured with the program to perform operations further comprising setting the first potential in a stepwise manner.

9. The power control apparatus according to claim 1, wherein the second conversion apparatus is included in an attachable and detachable module.

10. The power control apparatus according to claim 9, wherein the module includes the power storage unit together with the second conversion apparatus.

11. A power control method for a power control apparatus, the power control apparatus comprising:
a direct current bus supplying direct current power;
a first conversion apparatus that applies DC/DC conversion to direct current power from a power generator, and outputs the resultant direct current power to the direct current bus;
a second conversion apparatus that applies DC/DC4 conversion to direct current power from the direct current bus and charges a power storage unit with the resultant direct current power, applies DC/DC conversion to direct current power from the power storage unit, and discharges the resultant direct current power to the direct current bus;
a third conversion apparatus that applies DC/AC conversion to the direct current power from the direct current bus and supplies alternating current power to a power system and an alternating current load; and
a controller configured with a program to control driving of the first to third conversion apparatuses;
the power control method comprising:
setting, via the controller, when output from the power generator is lower than a predetermined threshold, a potential of the direct current bus to a first potential that enables the first conversion apparatus to perform stable operation;
causing, via the controller, the second conversion apparatus to perform the charge; and
suspending, via the controller, the third conversion apparatus.

12. The method according to claim 11, wherein the measured output is a power output and the predetermined threshold is a power threshold.

13. The method according to claim 12, further comprising:
boosting, via the controller, when an amount of power stored in the power storage unit exceeds a predetermined amount, the potential of the direct current bus to a second potential;
causing, via the controller, the second conversion apparatus to perform the discharge; and
driving, via the controller, the third conversion apparatus; wherein
the second potential enables the third conversion apparatus to supply an alternating current power of a prescribed voltage to the power system and the alternating current load.

14. The method according to claim 13, further comprising:
causing, via the controller, the third conversion apparatus to apply DC/AC conversion to a combination of the power output from the first conversion apparatus and the power discharged by the second conversion apparatus.

15. The method according to claim 11, wherein the measured output is a voltage output and the predetermined threshold is a voltage threshold.

16. The method of claim 15, further comprising:
boosting, via the controller, when the voltage output from the power generator exceeds the predetermined voltage, the potential of the direct current bus to a second potential;
causing, via the controller, the second conversion apparatus to perform the discharge; and
driving, via the controller, the third conversion apparatus; wherein
the second potential enables the third conversion apparatus to supply an alternating current power of a prescribed voltage to the power system and the alternating current load.

17. The method of claim 16, further comprising:
causing, via the controller, the third conversion apparatus to apply DC/AC conversion to a combination of the output from the first conversion apparatus and the output from the second conversion apparatus.

18. The method of claim 11, wherein the controller is further configured with the program such that setting, via the controller, the first potential comprises setting the first potential in a stepwise manner.

19. A non-transitory computer readable medium comprising instructions that, when executed, cause a processor to control a power control apparatus comprising:
  a direct current bus serving as a path for supplying direct current power;
  a first conversion apparatus that applies DC/DC conversion to direct current power from a power generator, and outputs the resultant direct current power to the direct current bus;
  a second conversion apparatus that applies DC/DC conversion to the direct current power from the direct current bus, charges a power storage unit with the resultant direct current power, applies DC/DC conversion to direct current power from the power storage unit, and discharges the resultant direct current power to the direct current bus; and
  a third conversion apparatus that applies DC/AC conversion to the direct current power from the direct current bus and supplies alternating current power to a power system and an alternating current load;
the instructions causing the processor to perform operations comprising:
setting, when a measured output from the power generator is lower than a predetermined threshold, a potential of the direct current bus to a potential that enables the first conversion apparatus to perform stable operation;
causing the second conversion apparatus to perform the charge; and suspending the third conversion apparatus.

20. An energy management system, comprising:
  a power generator;
  a power storage unit for storing power;
  a direct current bus supplying direct current power;
  a first conversion apparatus that applies DC/DC conversion to direct current power from the power generator, and outputs the resultant direct current power to the direct current bus;
  a second conversion apparatus that applies DC/DC conversion to the direct current power from the direct current bus and charges the power storage unit with the resultant direct current power, applies DC/DC conversion to direct current power from the power storage unit, and discharges the resultant direct current power to the direct current bus;
  a third conversion apparatus that applies DC/AC conversion to the direct current power from the direct current bus and supplies alternating current power to a power system and an alternating current load;
  a fourth conversion apparatus that applies DC/DC conversion to the direct current power from the direct current bus and supplies the resultant direct current power to a DC load; and
  a controller configured with a program to control driving of the first to fourth conversion apparatuses, wherein
when output from the power generator is lower than a predetermined threshold, the controller is configured with the program to perform operations comprising:
setting a potential of the direct current bus to a first potential that enables the first conversion apparatus to perform stable operation,
causing the second conversion apparatus to perform the charge, and suspending the third conversion apparatus.

* * * * *